(12) United States Patent
Schaefer (10) Patent No.: US 7,428,957 B2
(45) Date of Patent: Sep. 30, 2008

(54) ORDER PICKING STATION AND ORDER PICKING METHOD

(75) Inventor: Gerhard Schaefer, Neunkirchen (DE)

(73) Assignee: SSI Schaefer Peen GmbH, Graz (AT)

( * ) Notice: Subject to any disclaimer, the term of this patent is extended or adjusted under 35 U.S.C. 154(b) by 251 days.

(21) Appl. No.: 11/296,872

(22) Filed: Dec. 8, 2005

(65) Prior Publication Data

US 2006/0182543 A1 Aug. 17, 2006

Related U.S. Application Data

(63) Continuation of application No. PCT/EP2004/007553, filed on Jul. 9, 2004.

(51) Int. Cl.
*B65G 1/137* (2006.01)

(52) U.S. Cl. .................. 198/345.1; 198/346; 198/436

(58) Field of Classification Search .............. 700/214, 700/216, 217; 198/346, 345.1, 436
See application file for complete search history.

(56) References Cited

U.S. PATENT DOCUMENTS 3,621,672 A * 11/1971 Meredith .................. 62/237
5,967,330 A * 10/1999 Buer ....................... 209/12.1
5,983,648 A * 11/1999 Morchen ..................... 62/63
6,597,969 B2 * 7/2003 Greenwald et al. ......... 700/216
2004/0197171 A1 10/2004 Freudelsperger

FOREIGN PATENT DOCUMENTS

| DE | 2 158 537 A | 6/1972 |
| DE | 21 58 537 A | 6/1972 |
| DE | 298 06 960 U | 9/1998 |
| DE | 298 06 960 U1 | 9/1998 |
| DE | 297 24 039 U | 4/1999 |
| DE | 297 24 039 U1 | 4/1999 |
| DE | 102 00 077 A | 12/2002 |
| DE | 101 36 354 A | 2/2003 |
| JP | 04116001 A | 4/1992 |

* cited by examiner

*Primary Examiner*—Douglas A Hess
(74) *Attorney, Agent, or Firm*—McNeely Bodendorf LLP; Kevin J. McNeely (57) ABSTRACT

An order picking station (30) to which storage containers (34) can be transported via a storage container conveyor line (36) and from which order containers (40), into which articles (38*a*, 38*b*) from the storage containers (34) are picked by an order picking person (32), can be transported away via an order container conveyor line (52), the order picking station (30) having a buffer (44) for a plurality of order containers (40) which are to be picked, and wherein the order containers (40) can be stored into the buffer (44) and/or removed from the buffer (44) by means of a shuttle (46) (FIG. 3).

22 Claims, 5 Drawing Sheets

ORDER PICKING STATION AND ORDER PICKING METHOD

RELATED APPLICATIONS

This is a continuation application of co-pending international patent application PCT/EP2004/007553 filed Jul. 9, 2004 which claims priority of German application DE 103 40 143.1 filed on Aug. 26, 2003 which is fully incorporated by reference herewith.

BACKGROUND OF THE INVENTION

The present invention relates to an order picking station, to which storage containers can be transported via a storage container conveyor line and from which order containers, into which articles from the storage containers are picked for an order by an order picking person, can be transported away via an order container conveyor line, the order picking station having a buffer for a plurality of order containers to be picked.

RELATED PRIOR ART

Such an order picking station is known in the prior art according to the document DE 101 36 354 A1.

In addition, the invention relates to an order picking system.

An order picking system according to the prior art is described generally in DE 297 24 039 U1.

Furthermore, the invention relates to a method for order picking articles from storage containers into order containers, the storage containers being transported to an order picking station via a storage container conveyor line, the articles being picked for an order by an order picking person into order containers to be picked for an order, which are transported away from the order picking station via an order container conveyor line, and the articles being picked for an order into order containers of a buffer being designed for a plurality of order containers to be picked.

Such a method is likewise disclosed by the already mentioned above DE 101 36 354 A1.

In the prior art, order picking stations, in particular order picking systems, are known with which containers can be filled with goods, that can be handled and which are supplied via a conveying apparatus, such as a conveyor belt.

The containers into which orders are picked, that is to say which are filled with articles, will be called order containers in the following. They are called order containers since the articles or goods to be picked into the order containers are picked into the order containers in accordance with a pre-defined order. An order can comprise a plurality of different articles, which are then picked into one and the same order container or a plurality of order containers.

The picking of the articles is generally carried out at what are known as order picking stations. An order picking station is the location where an order picking person picks the articles into the order containers. For this purpose, the order picking person removes the articles from storage containers. The storage containers are supplied to the order picking person via a storage container conveyor line. The storage container conveyor line can be a conveying apparatus, for example such as a conveyor belt or the like.

The storage containers from which orders are picked are transported from a container store to the order picking station via the storage container conveyor line. The container store comprises a large number of filled storage containers, in which all of the articles which are ready to be picked are stored.

Often, many different articles from extremely varying regions of the container store are to be picked into the same order container in order to process the order. An enormous logistical effort is required for this purpose.

In order to increase the effectiveness of an order picking system, numerous improvement proposals have therefore already been made.

For instance, the already mentioned above DE 297 24 039 U1 proposes an order picking system having a sorting buffer. This order picking system has a container store with conveying apparatuses for the transport of the storage containers from the container store to a plurality of order picking stations. Between the container store and the order picking stations, a distribution system is provided to distribute the containers to the individual workstations. A sorting buffer is in turn arranged between the distribution system and the workstations. In such a sorting buffer, the storage containers can be pre-sorted before they are supplied to the order picking station.

In order to improve the efficiency of an order picking system, DE 298 06 960 proposes that, instead of having the order picking person move with the order container to the storage containers in the storage rack, the storage containers be supplied to the order picking person at the order picking station. Furthermore, it is proposed to set up a large number of order picking buckets at the order picking station. Via the order picking buckets, the order picking person is able to route the article to be picked into order containers to be filled. The buckets provide the possibility for convenient insertion and, at the same time, for specific fed of the articles into the order containers. A bucket runs obliquely from top to bottom with a slope which allows the goods to slide down under action of the force of gravity. In the lower region of the buckets, a closure can be provided in order to be able to begin order picking before the order container has arrived under the bucket. As an option, the articles introduced can be detected and registered, in order to be able to carry out a subsequent inspection.

The aforementioned DE 101 36 354 A1 discloses a method and a system for order picking having a container rack and an associated storage and retrieval device. In this system, storage containers are also supplied to an order picking station via a storage container conveyor line. Finished containers, for which an order has been picked, are transported away via an order container conveyor line. Furthermore, a buffer for three order containers is disclosed. Empty order containers, which are transported to the order picking station via a conveyor line, are removed by a slide in a removal region. The slide is fitted to the conveyor line laterally and pushes empty order containers to be picked from the conveyor line into the buffer. For each of the three spaces in the buffer which are provided to hold an order container, respectively one slide is mounted to the conveyor line. In the buffer itself, a respective further apparatus is provided for each order container, which automatically pushes a filled and completely picked order container back into the conveyor line, so that the order container leaves the buffer.

Despite the plethora of proposals for increasing the efficiency, in particular the order picking speed, it is desirable to be able to pick orders even more quickly. In the process, care should be taken that the order picking person is strained as little as possible, in view of the strict statutory ergonomic requirements.

It is therefore an object of the present invention to improve the order picking stations and methods known from the prior art to the effect that orders can be picked even more efficiently and quickly.

SUMMARY OF THE INVENTION

This object is achieved by an order picking station as mentioned at the outset, wherein the order containers are stored into the buffer and/or removed from the buffer by means of a shuttle.

This object is also achieved by a method as mentioned at the outset, the order containers being stored into the buffer and/or removed from the buffer by means of a shuttle.

Furthermore, this object is achieved by an order picking system which is equipped with at least one order picking station according to the invention.

By providing a shuttle which stores the order containers into the buffer and/or removes the order containers out of the buffer, order picking can be configured substantially more efficiently. The shuttle makes it possible, firstly, to keep a large number of order containers in the buffer at the same time. The order containers located in the buffer do not have to be located in the region which the order picking person can cover with his arms if he stands fixed in one place during the order picking process. The shuttle can transport order containers, which are outside the arm's-length of the order picking person, into a region which is within the arm's-length of the order picking person or within the region of a bucket outlet.

Furthermore, only one single apparatus is necessary in order to transport order containers to and fro between the buffer and the order container conveyor line. As a result, the number of elements is reduced, which are required in an order picking system, ensuring the smooth flow of the containers in the system. This also manifests itself in simpler and less complex control of the overall system, since fewer elements in the overall system have to be controlled.

Furthermore, it is preferred when the shuttle is interconnected between an inlet and an outlet of the order container conveyor line.

This is advantageous since, in this way, the sequence of the order containers on the order container conveyor line can be affected. Firstly, the sequence can be affected in that the shuttle fetches specific order containers from the buffer in accordance with a predetermined arrangement, and subsequently passes them to the outlet of the order container conveyor line. Secondly, in this way it is possible to affect the time when an empty order container is fetched from the inlet by the shuttle in order to be transported into the buffer.

Furthermore, it is preferred that the shuttle has at least one load-lifting means with which at least one order container can be picked and/or passed.

As a result of this measure, the shuttle operates quickly and efficiently. The shuttle can pick up or pass one or more order containers at the same time. A shuttle having two load-lifting means can simultaneously pick an order container from the inlet while another, already filled and completely picked order container is passed from the buffer to the outlet.

According to a further preferred embodiment, the buffer can be connected to the order container conveyor line by means of a conveyor line loop.

As a result of this measure, the order containers can be coupled out of the main flow of the order containers via the loop before they reach the order picking station. As a result, the main flow of the order containers can be controlled even better, since the "braking" effect of the order picking takes place in the loop and not in the main flow. In particular if a plurality of order picking stations is provided, a type of pre-sorting of the order containers can be carried out, which likewise increases the order picking speed.

According to a further preferred embodiment, the order containers are stored statically in the buffer.

This has the advantage that no complicated control and pre-planning is required in order to allocate the articles to be picked to their corresponding order container. The logistical requirements are lower. The planning of the order picking process becomes simpler.

Alternatively, it is preferred to store the order containers dynamically in the buffer.

In the case of dynamic storage of the order containers in the buffer, which means that the order containers can change their location within the buffer once or repeatedly during the order picking process, the speed of the overall system can be increased since, for example, order containers which are located far relative to the order picking station in the buffer can be brought closer into the direct access range of the order picking person.

According to another embodiment, the buffer has two regions for respectively receiving at least one order container, between which the shuttle is arranged such that it can move.

As a result, the shuttle can operate more quickly. In this way, for instance, a completely picked order container from the first region can be taken by the shuttle and an empty order container can be passed to the buffer by the shuttle. In the case of a shuttle that can take only one order container, this process is carried out sequentially, the empty order container being delivered first. In the case of a shuttle which can take a plurality of order containers, this process can also be carried out simultaneously.

Furthermore, it has also proven to be advantageous if the order picking station has a plurality of order picking buckets, through which articles can respectively be led into one of the order containers.

The advantage in this case is that the order containers can also be positioned within the buffer and outside the arm's-length of the order picking person. By means of the order picking buckets, whose openings are located within the arm's-length of the order picking person, articles can be led via relatively long paths to an appropriate order container. Here, it is advantageous in particular if the order picking bucket has an inclination, that is to say if the order containers are located at a lower level than the opening of the order picking bucket.

In addition, it is advantageous if each order container of the buffer is respectively assigned a single order picking bucket.

As a result, the association between the opening of an order picking bucket and the associated order container is simplified.

According to a further embodiment, the order containers are completely finish-picked at the order picking station.

As a result of this measure, the order containers do not have to be transported to and fro between different order picking stations resulting in a longer duration of the order picking process, which would be disadvantageous.

It is also advantageous if the order picking station also has a correction conveyor line for re-picking order containers, which have been picked wrongly, running through the pick region of the order picking person.

As a result, the order container for which an order has been picked wrongly does not have to be re-supplied to an order picking station to be re-picked, which would take longer. Instead, the same order picking person who caused the error can correct the error on site, thereby accelerating the overall order picking process (of the system).

According to a further embodiment, the order picking station is connected to a store-input conveyor line, via which store-input containers can be supplied to the order picking station in order to refill storage containers which are located on the storage container conveyor line.

As a result of this measure, in idling phases in which the order picking person is not picking or cannot pick articles for the orders into order containers, the order picking person can refill storage containers. For instance, a specific article can be used up completely during the overall order picking process, that is to say it can no longer be obtained in the container store. This can then be detected by a control system superimposed on the order picking system, such as a computer or a large computer. As a reaction to this, a store-input container which contains the articles missing from the container store can be supplied to the order picking station via a store-input conveyor line. From there, the order picking person can refill an "empty" storage container, so that the article is again available.

According to a further preferred embodiment, the shuttle can be moved along a shuttle aisle.

As a result, the shuttle can cover large distances in the buffer. In addition, the shuttle is able to serve two regions of the buffer simultaneously, specifically in each case those which are located laterally to the shuttle aisle.

Furthermore, it is preferred if a single shuttle is responsible for a plurality of buffers.

As a result of this measure, the number of elements of the overall order picking system can be reduced further. This means that costs can be lowered and the planning of the overall order picking process can be simplified.

It goes without saying that the features mentioned above and those still to be explained below can be used not only in the respectively specified combination but also in other combinations or on their own without departing from the scope of the present invention.

BRIEF DESCRIPTION OF THE DRAWINGS

Further advantages and features of the invention emerge from the following description of an exemplary embodiment by using the drawings, in which.

DESCRIPTION OF PREFERRED EMBODIMENTS

Figure 1:
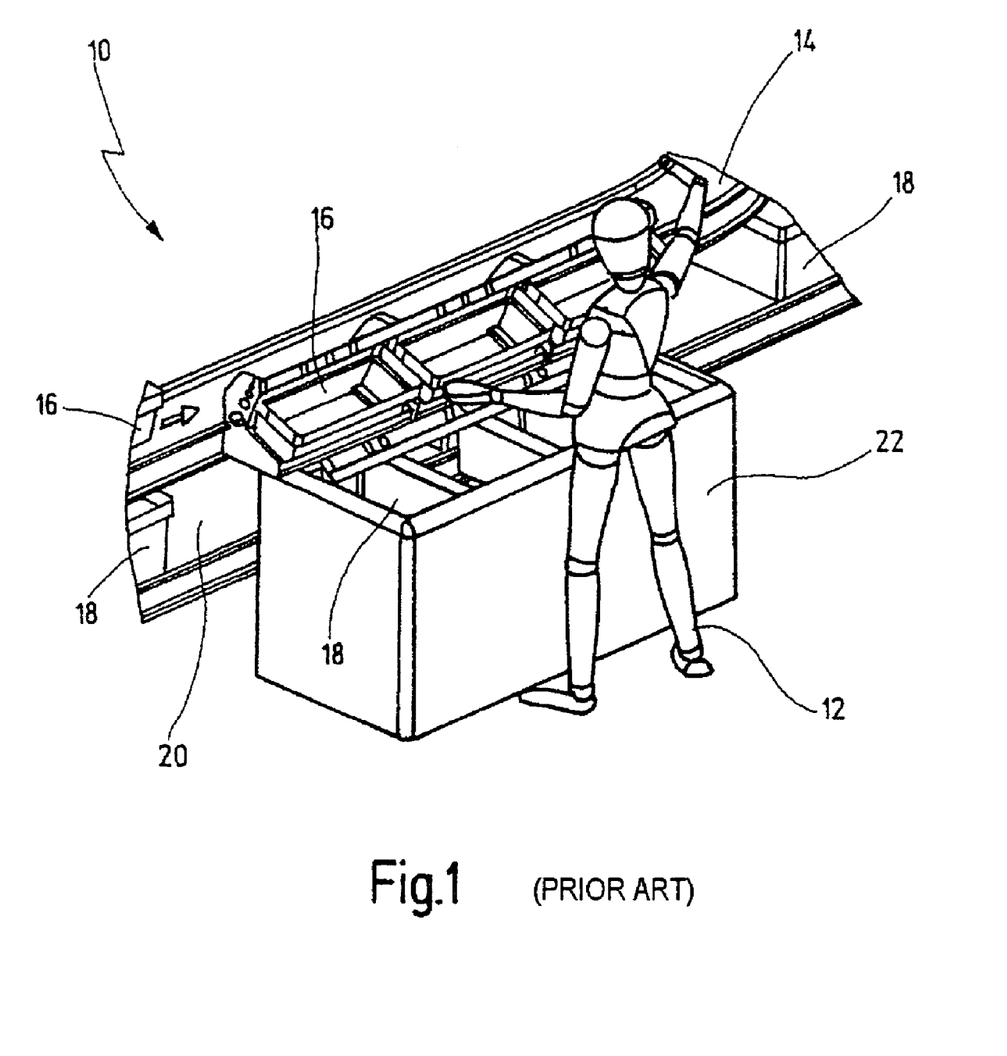
FIG. 1 shows an order picking station according to the prior art, which has a buffer for a plurality of order containers.

FIG. 1 shows schematically an order picking station according to the prior art, which is designated generally by the reference number 10.

The order picking station 10 is operated by an order picking person 12. Storage containers 16 are transported to the order picking station 10 via a storage container conveyor line 14. Underneath the storage container conveyor line 14, order containers 18 are transported to the order picking station 10 and away from the latter via an order container conveyor line 20.

Furthermore, the order picking station 10 has a buffer 22 for the order containers 18. The buffer 22 shown here can accommodate three order containers 18. To this end, the (empty) order containers 18 coming from the order container conveyor line 20 are pushed into one of the spaces in the buffer 22 by a slide (not illustrated here). The slide is arranged laterally to the order container conveyor line and opposite to a buffer space. A separate slide is required for each buffer space.

In order to convey order containers 18 located in the buffer onto the order container conveyor line 20 again, for each buffer space the buffer 22 respectively has a further apparatus which pushes the appropriate order container 18 onto the order container conveyor line 20.

Figure 2:
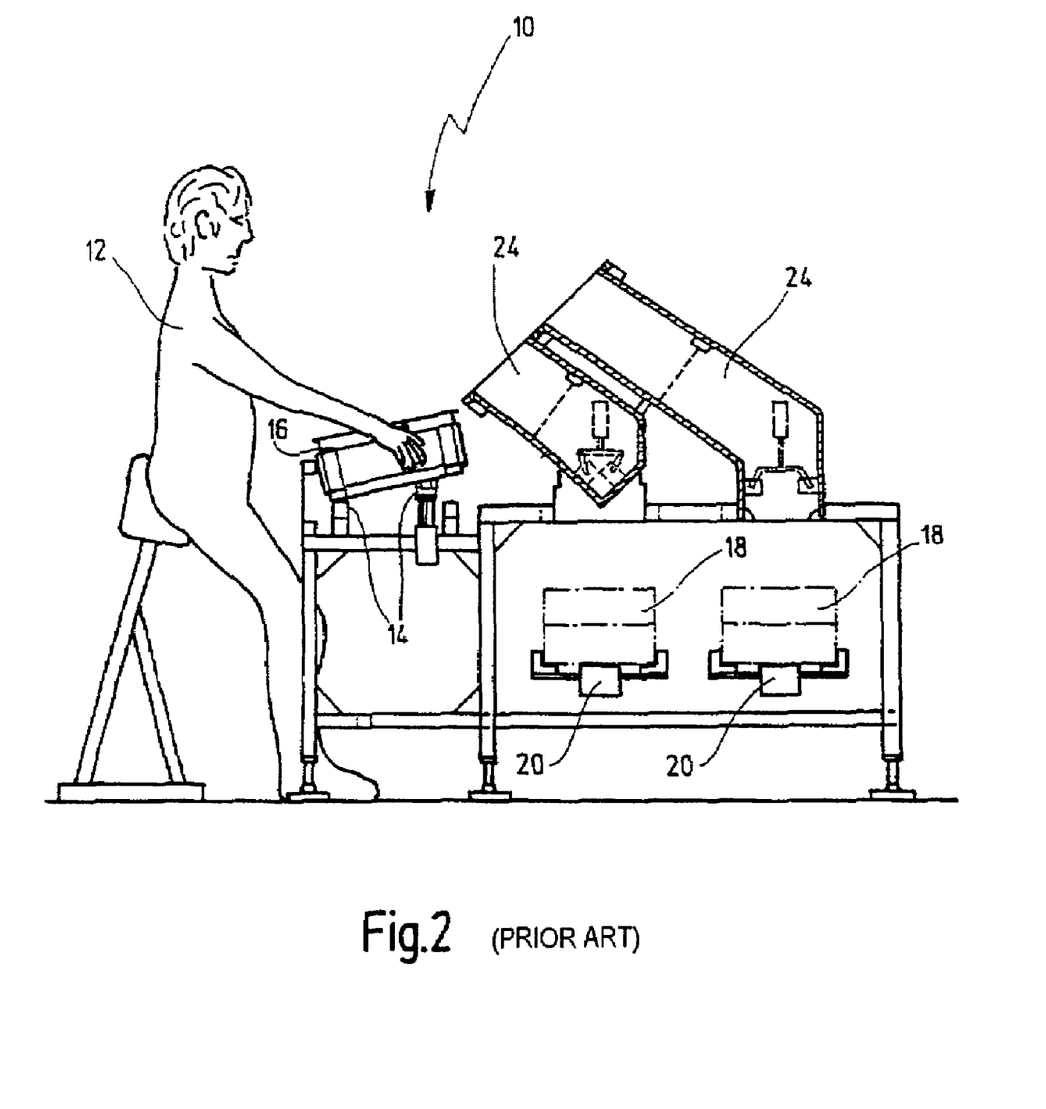
FIG. 2 shows a further order picking station according to the prior art, which has order picking buckets.

A further order picking station 10 according to the prior art is shown schematically in a side view in FIG. 2.

The order picking station 10 of FIG. 2 likewise has a storage container conveyor line 14, via which storage containers 16 are transported to the order picking station 10. An order picking person 12 can then reach into the storage containers 16 in order to remove therefrom an article (not shown) to be picked. The article removed is then put into an order picking bucket 24, from which it is led into an order container 18.

In the order picking station 10 of FIG. 2, a plurality of order picking buckets 24 is provided. However, each order container 18 is assigned two order picking buckets 24 arranged beside each other.

During the order picking, the order containers 18 are located permanently on the order container conveyor line 20 and have their orders picked sequentially.

Figure 3:
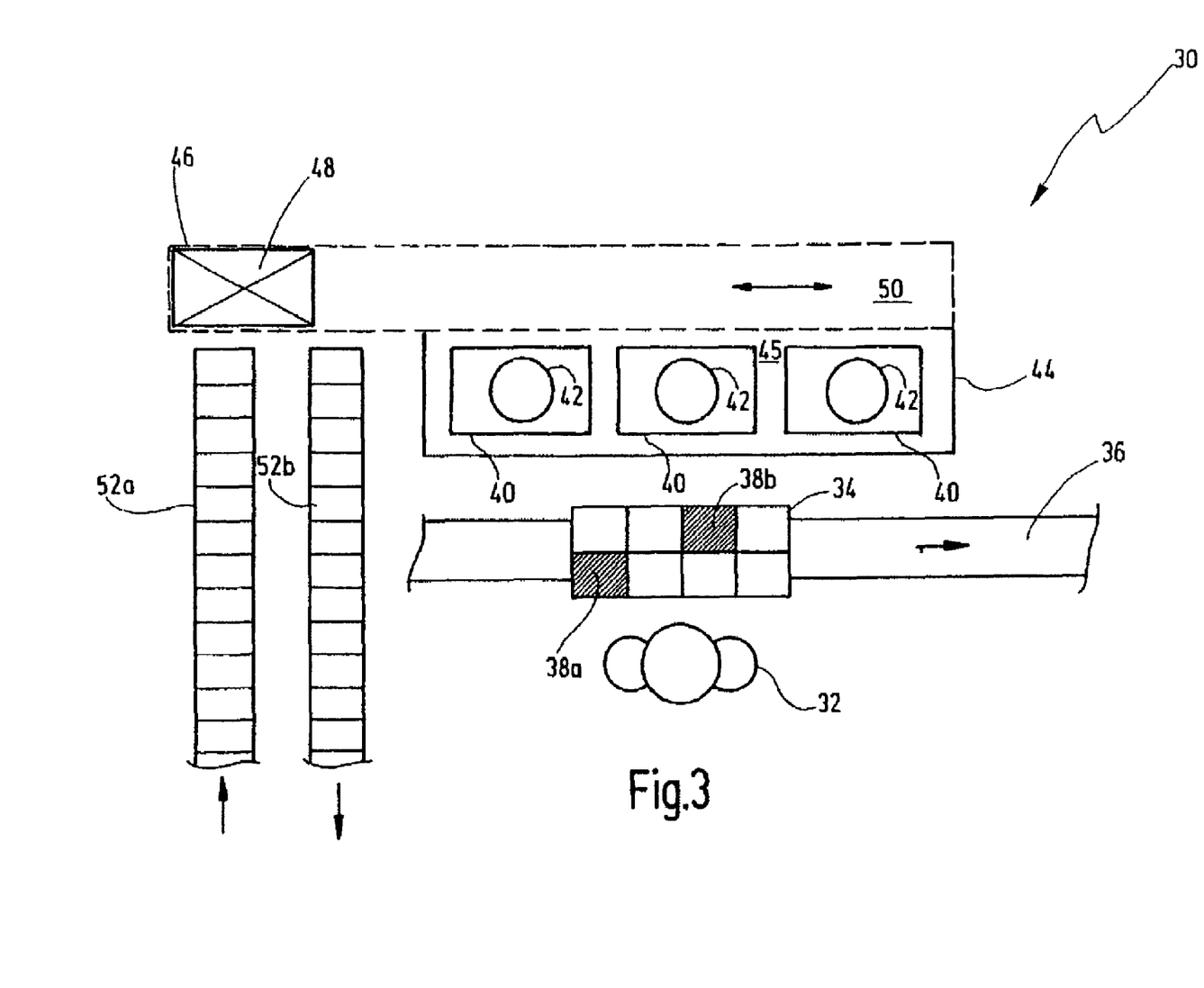
FIG. 3 shows a schematic representation of an order picking station according to the present invention.

FIG. 3 schematically shows an order picking station according to a first embodiment of the present invention, an order picking station according to the invention being designated generally by the reference number 30.

The order picking station 30 is operated by an order picking person 32. The order picking person 32 is supplied with storage containers 34 from a container racking system (not shown), delivered via a storage container conveyor line 36.

In the example shown in FIG. 3, the storage container 34 contains two articles 38a and 38b to be picked for an order. The remaining spaces in the storage container 34 illustrated as an example here are already empty. The order picking person 20 can then remove one or both of the articles 38a and 38b, depending on the order picking job, in order to put them into an order container 40 for the order.

The order picking station 30 preferably also has order picking buckets 42, similar to the order picking buckets 24 of FIG. 2. In FIG. 3, only the closable outlet openings of the order picking buckets 42, which are located above the order containers 40, are indicated schematically. The order containers 40 themselves are located here in a buffer 44 for order containers. The buffer 44 can, for example, be arranged opposite the order picking person 32 and along the storage container conveyor line 36.

The buffer 44 is "served" by means of a single shuttle 46, as it is known. The shuttle 46 can have a loadlifting means 48. The shuttle 46 is mounted such that it can be moved along a shuttle aisle 50. The shuttle aisle 50 is arranged on the side of the buffer 44 which is opposite the side which adjoins the storage container conveyor line 36. However, another arrangement of the shuttle aisle 50, of the buffer 44, and of the storage container conveyor line 36 in relation to one another is likewise possible.

The shuttle aisle 50 illustrated in FIG. 3 extends beyond the length of the buffer 44 on one side, the lefthand side here. There, the shuttle aisle 50 adjoins an inlet 52a and an outlet 52b of an order container conveyor line designated generally by the reference number 52. Via the inlet 52a, empty order containers 40 are transported towards the shuttle aisle 50. From there, they can be fetched by the shuttle 46 in order to be set on one of the spaces in the buffer 44 by the shuttle 46. The order containers 40 supplied via the inlet 52a are generally empty but can also already be partly prefilled.

Finished order containers 40 for which orders have been picked are transported away via the outlet 52b. To this end, the completely picked order containers 40 are fetched from the buffer 44 by means of the shuttle 46 and passed to the outlet 52b.

It should be noted that, in the order picking station 30 illustrated in FIG. 3, only a single shuttle 46 provides the transport of the order containers 40 between the buffer 44 and the order container conveyor line 52, and vice versa.

Figure 4:
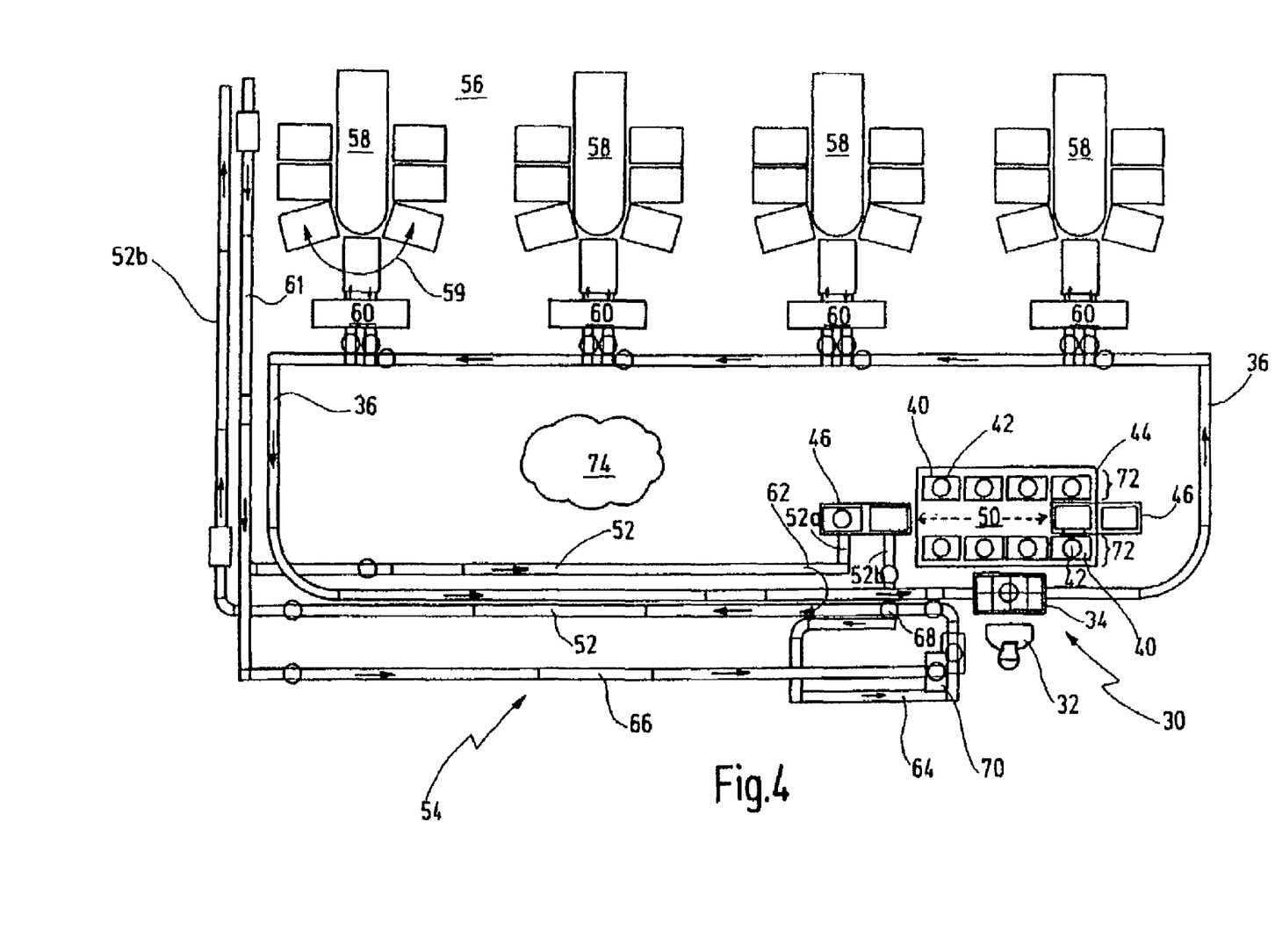
FIG. 4 shows a schematic representation of an order picking system which has an order picking station according to the present invention.

FIG. 4 schematically shows an order picking system which is designated generally by the reference number 54.

The order picking system 54 comprises a second embodiment of an order picking station 30 according to the present invention, which will be discussed in more detail below.

The storage containers 34 are stored in a container store, which is designated generally by the reference number 56. The container store 56 can comprise one or more carousels 58 or other types of container stores (e.g. with storage and retrieval devices). The carousels 58 have compartments (not illustrated), in which the storage containers 34 are stored. In this case, a plurality of compartments can be arranged one above another. The compartments can be rotated about the carousels 58 in any desired direction, as indicated by an arrow 59. In front of the carousels 58, respectively a forward zone 60 is arranged, which can have a lift (not illustrated). By means of the lift, storage containers 34 can be fetched from compartments at different heights and brought to the level of the storage container conveyor line 36. The storage containers 34 are then conveyed by means of suitable devices onto the self-contained storage container conveyor line 76, on which they are transported in the direction of the order picking station 30.

Empty order containers 40 are transported toward the order picking station 30 via an inlet 52a and away from the order picking station 30 via an outlet 52b.

The inlet 52a and the outlet 52b, in conjunction with the shuttle 46, form a conveyor line loop which is indicated by an arrow 62. The conveyor line loop 62 here is connected to a main conveyor line 61. Via the main conveyor line 61, empty order containers 40 can be transported toward the order picking station 30 and full storage containers 70 can be transported toward a correction conveyor line 64.

The correction conveyor line 64 adjoins a storage conveyor line 66, via which the storage containers 70 can be supplied from the main conveyor line 61 to the correction conveyor line 64 adjoining. The correction conveyor line 64 is preferably located within the reach of the operating persons' 32 arms and fulfills a plurality of functions.

A first function of the correction conveyor line 64 is to transport order containers 40 for which orders have been picked wrongly to the order picking person 32 for repicking. To this end, an order container 40 for which an order has been picked wrongly is fetched from the buffer 44 by the shuttle 46 and passed to the outlet 52b. The outlet 52b is connected to the correction conveyor line 64 at a junction 68. The conveyor line 64 begins and ends here at the junction 68. The order container 40 for which an order has been picked wrongly is introduced into the correction conveyor line 64 from the outlet 52b via the junction 68, in order to be brought within the reach of the order picking person 32. Having arrived there, it can be re-picked by the operating person 32 in that, for example, an article too many, which is in the order container 40, is sorted out or placed in a storage container 34 remaining provided or provided again, or in an appropriate store input container 70 on the storage path 66.

Should an article be missing from an order container 40 for which an order has been picked wrongly, the order picking person 32 can remove the article from a storage container 34 which has been transported to the order picking station 30 via the storage container conveyor line 36.

After the order container 40 for which an order has been picked wrongly has been re-picked, it is transported in the direction of the junction 68 via the correction conveyor line 64. At the junction 68, the re-picked order container 40 is incorporated in the outlet 52b again in order to return to the original circulation.

In a similar way, an order container 40 for which an order has been picked wrongly in which there is both an article too many and from which articles are also missing can be repicked, by the procedures just described above being combined.

In addition, the operating person 32 can refill empty or nearly empty storage containers 34 in idling phases of the order picking process. To this end, an appropriate store-input container 70 is transported in the direction of the order picking station 30 via the storage conveyor line 66. If the refilling of the storage containers 34 should empty the store input container 70, then the store-input container 70 can be placed by the order picking person on the correction conveyor line 64, from which the empty store-input container 70 is transported away from the order picking station via the junction 68 and the outlet 52b. If appropriate, it is also possible to take a (full) store-input container 70 from the storage conveyor line 66 and to place it on the storage container conveyor line 34. The store-input container 70 then functions as a storage container 34. In addition, empty storage containers 34 can likewise be placed on the correction conveyor line 64 to be transported away.

A further function of the correction conveyor line 64 is to transport order containers 40 for which orders have not yet completely been picked to the order picking person 32 via the correction conveyor line 64 for re-picking. In this way, articles, what are known as special articles, which, for example, do not physically fit in one of the order picking buckets 42, can be picked into an order container 40. Via the main conveyor line 61 and the store-input conveyor line 66, storage containers 34 that contain the special articles could be transported to the order picking person 32. The main conveyor line 61 is, therefore, preferably connected to the storage container conveyor line 36. However, such a connection is not illustrated in FIG. 4.

After the order picking person 32 has deposited the (bulky) special article in the order container 40 waiting on the correction conveyor line 64, the order container 40 can be transported away. The storage container 34 which contains the bulky article or articles can be lifted off the store input conveyor line 66 by the operating person 32 onto the storage container conveyor line 36 for transport into the container store 56.

The store-input conveyor line 66 is also used here to put into store articles which do not originate from single-type store-input containers 70. A store-input container 70 which is not a single-type container contains at least two articles which are not identical. Single-type store-input containers 70 which have a plurality of articles of one and the same type could be input directly from the main conveying section 61 into the storage container conveyor line 36 via a connection (not illustrated) in order to fill or to refill the container store 56.

In addition, what are known as "returns" could be put into store again via the store-input conveyor line 66. To this end, the order picking person 32 could register the articles from the "returns" and put them into appropriately supplied storage containers 34 for storage in the container store 56.

The order picking station 30 shown in FIG. 4 differs from the order picking station of FIG. 3 inasmuch as two buffer regions 72 are provided in the buffer 44. The buffer regions 72 are arranged along the longitudinal side of the shuttle aisle 50. The shuttle 46 of FIG. 4 differs from the shuttle of FIG. 3 inasmuch as the shuttle 46 of FIG. 4 is able transport two or more order containers 40 simultaneously.

In the event that the shuttle 46 can transport two order containers 40 simultaneously, a large number of possibilities are opened up. The shuttle 46 could simultaneously take an empty order container 40 from the inlet 52*a* and pass a finished order container 40, for which an order has been picked and which originates from the buffer 44, to the outlet 52*b*. Furthermore, the shuttle 46 in the buffer 44 then can simultaneously set down an empty order container 40 at one of the empty spaces in the buffer 46, while a completely picked order container 44 is being taken.

The shuttle 46 can set down an empty order container 40, which comes from the inlet 52*a*, directly at the outlet 52*b*. In this case, the empty order container 40 is not put into store in the buffer 44. In this way, order containers 40 which are located in the buffer 44 can be bypassed or overtaken.

Such a procedure is advantageous when an order container 40 has to be processed with maximum priority with regard to the order picking job. The (empty) high-priority order container 40 is transported to the order picking person 32 via the inlet 52*a*, the shuttle 46, the outlet 52*b* and then via the correction conveyor line 64. The order picking person 32 picks the articles with high priority from storage containers 34 transported appropriately to the order picking station 30 into the waiting order container 40. The order container 40 with high priority is transported away via the order container conveyor line 52 after the order picking process has been completed.

In addition, while an order container 40 is being taken or set down in the buffer 44, another order container 40 which is located in the upper or lower region 72 of the buffer 44 could be changing the corresponding region 72, in order to manage the buffer dynamically. Such processes could be monitored by a higher-order control system 74, which is indicated schematically by a cloud in FIG. 4.

However, static management of the buffer store 44 is also possible, in which an order container 40 brought into the buffer 44 always maintains one and the same space within the buffer 44 during its order picking process. The user of the order picking system 54 is free to choose how he wishes to manage the buffer 44.

The load-lifting means 48 of the shuttle 46 preferably move order containers 40 stored thereon transversely with respect to the alignment of the shuttle aisle 50.

Figure 5:
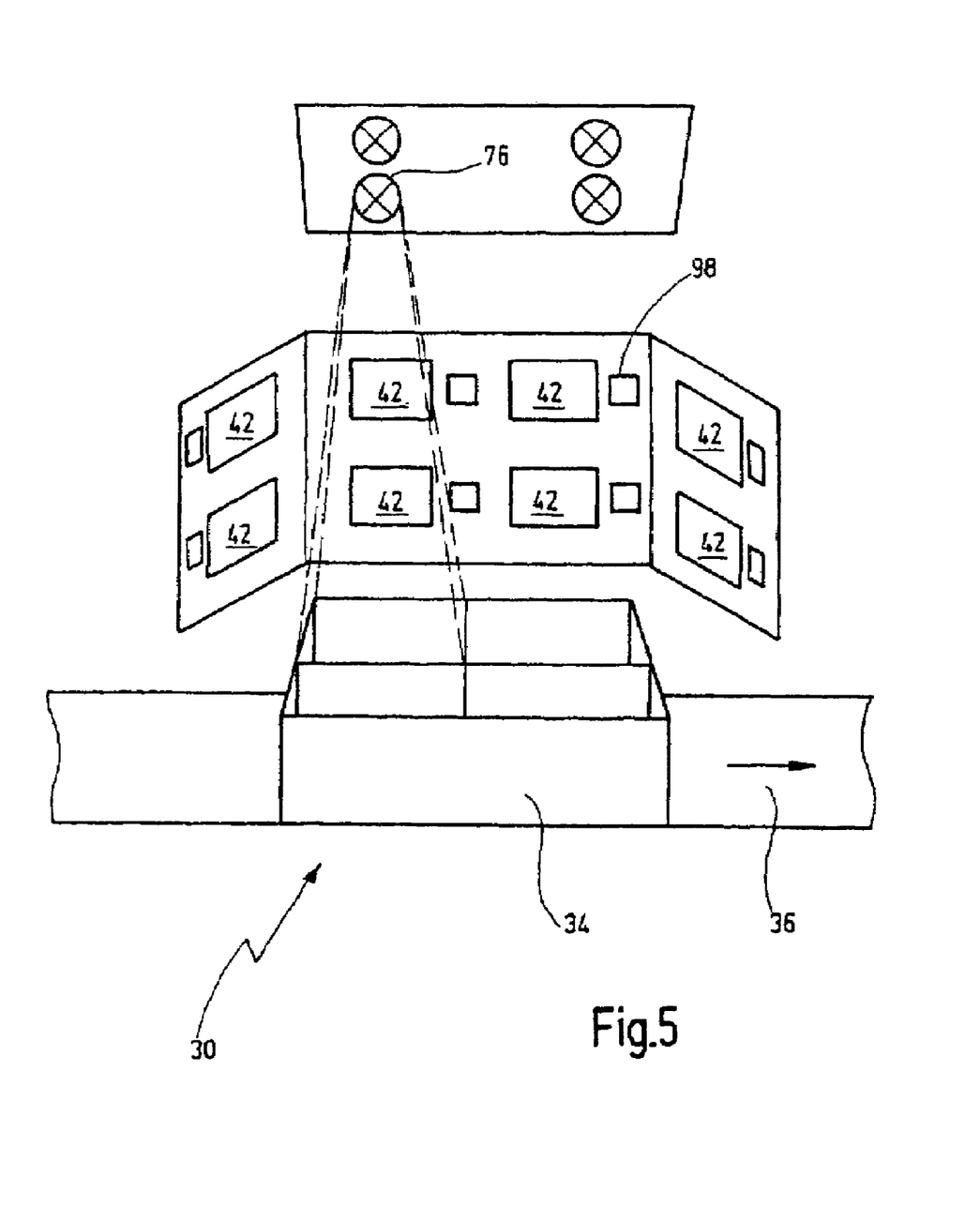
FIG. 5 shows a schematic perspective view of a further order picking station according to the present invention.

FIG. 5 schematically shows a third embodiment of an order picking station 30 according to the present invention.

The order picking station 30 has a large number of order picking buckets 42, which are preferably assigned to a single order container 40 (not shown) respectively. The order picking buckets 42 are arranged ergonomically around the workstation of the order picking person, in that a first number of buckets is located directly behind the storage containers and further buckets are aligned laterally and obliquely in relation thereto.

Via a lighting element 76, such as a laser, the compartment of a storage container 34 from which the order picking person 32 has to remove an article can be indicated to the order picking person 32 (not shown). In each case an indicating element 78 is fitted at the side of the order picking bucket 42. The indicating element 78 of the order picking bucket 42 into which an order is to be picked indicates the number of articles to be picked. In the example of FIG. 5, two articles are to be thrown into the order picking bucket 42 which is located at the top right in the central order picking bucket area.

After this order picking process has been completed, the storage container 34 is transported away via the storage container conveyor line 36 and a new storage container 34 can be transported to the order picking station 30, which means that a new order picking process can be carried out.

As a rule, the order containers 40 are completely final-picked for an order in the buffer 44. However, order containers 40 for which orders have not been completely picked could also leave the buffer 44 in order to have the order picking finished at a different location.

What is claimed is:

1. An order picking station for order picking articles into order containers wherein said order picking is to be performed by an order picking person, comprising:
   a storage-container conveyor line for transporting storage containers, from which said articles are to be picked by said order picking person at said order picking station into said order containers, to said order picking station;
   an order-container conveyor line for transporting away said order containers, into which said articles have been picked by said order picking person, from said order picking station;
   a buffer for accommodating a plurality of said order containers to be picked; a shuttle for pulling said order containers to be picked into said buffer and removing said picked order containers from said buffer; and
   a conveyor line loop connecting said buffer to said order-container conveyor line, wherein said order containers are stored statically in said buffer.

2. The order picking station as claimed in claim 1, wherein said order-container conveyor line has an inlet and an outlet, and said shuttle is interconnected between said inlet and said outlet of said order-container conveyor line.

3. The order picking station as claimed in claim 2, wherein said shuttle has at least one load-lifting means for taking at least one of said order containers from said order-container conveyor line and for handing over to said order-container conveyor line.

4. The order picking station as claimed in claim 1, wherein said buffer has two regions for respectively accommodating at least one of said order containers, said shuttle being arranged in a movable manner between said two regions.

5. The order picking station as claimed in claim 1, wherein said order containers are completely picked for an order at said order picking station.

6. An order picking system having at least one order picking station as claimed in claim 1.

7. An order picking station for order picking articles into order containers wherein said order picking is to be performed by an order picking person, comprising:
   a storage-container conveyor line for transporting storage containers, from which said articles are to be picked by said order picking person at said order picking station into said order containers, to said order picking station;

an order-container conveyor line for transporting away said order containers, into which said articles have been picked by said order picking person, from said order picking station;

a buffer for accommodating a plurality of said order containers to be picked; a shuttle for putting said order containers to be picked into said buffer and removing said picked order containers from said buffer;

a conveyor line loop connecting said buffer to said order-container conveyor line; and a plurality of order picking buckets for respectively routing said articles into one of said order containers within said buffer.

8. The order picking station as claimed in claim 7, wherein each of said order containers within said buffer is respectively assigned an individual one of said order picking buckets.

9. An order picking system having at least one order picking station as claimed in claim 7.

10. The order picking station as claimed in claim 7, wherein said order-container conveyor line has an inlet and an outlet, and said shuttle is interconnected between said inlet and said outlet of said order-container conveyor line.

11. The order picking station as claimed in claim 10, wherein said shuttle has at least one load-lifting means for taking at least one of said order containers from said order-container conveyor line and for handing over to said order-container conveyor line.

12. The order picking station as claimed in claim 7, wherein said order containers are stored statically in said buffer.

13. The order picking station as claimed in claim 7, wherein said order containers are stored dynamically in said buffer.

14. The order picking station as claimed in claim 7, wherein said buffer has two regions for respectively accommodating at least one of said order containers, said shuttle being arranged in a movable manner between said two regions.

15. The order picking station as claimed in claim 7, wherein said order containers are completely picked for an order at said order picking station.

16. The order picking station as claimed in claim 7, wherein said buffer includes a shuttle aisle along which said shuttle moves.

17. The order picking station as claimed in claim 7, characterized in that a single shuttle is responsible for a plurality of buffers.

18. An order picking station for order picking articles into order containers wherein said order picking is to be performed by an order picking person, comprising:

a storage-container conveyor line for transporting storage containers, from which said articles are to be picked by said order picking person at said order picking station into said order containers, to said order picking station;

an order-container conveyor line for transporting away said order containers, into which said articles have been picked by said order picking person, from said order picking station;

a buffer for accommodating a plurality of said order containers to be picked; a shuttle for putting said order containers to be picked into said buffer and removing said picked order containers from said buffer; and a correction conveyor line for re-picking order containers for which an order has been picked wrongly, said correction conveyor line leading through a region into which said order picking person can reach.

19. The order picking station as claimed in claim 18, wherein said order picking station is connected to a store-input conveyor line, said store-input conveyor line supplying store-input containers to said order picking station for refilling said storage containers which are located on said storage container conveyor line.

20. The order picking station as claimed in claims 1 or 18, wherein said buffer includes a shuttle aisle along which said shuttle moves.

21. The order picking station as claimed in claim 1 or 18, characterized in that a single shuttle is responsible for a plurality of buffers.

22. An order picking system having at least one order picking station as claimed in claim 18.

* * * * *